(12) United States Patent
Kumabe (10) Patent No.: US 8,718,908 B2
(45) Date of Patent: May 6, 2014

(54) CONVOY TRAVEL APPARATUS

(75) Inventor: Seigou Kumabe, Okazaki (JP)

(73) Assignee: Denso Corporation, Kariya (JP)

( * ) Notice: Subject to any disclaimer, the term of this patent is extended or adjusted under 35 U.S.C. 154(b) by 100 days.

(21) Appl. No.: 13/614,005

(22) Filed: Sep. 13, 2012

(65) Prior Publication Data

US 2013/0080040 A1 Mar. 28, 2013

(30) Foreign Application Priority Data

Sep. 27, 2011 (JP) ................................. 2011-211069

(51) Int. Cl.
*G06F 19/00* (2011.01)

(52) U.S. Cl.
USPC ......................................................... 701/117

(58) Field of Classification Search
USPC ......................................................... 701/117
See application file for complete search history.

(56) References Cited

U.S. PATENT DOCUMENTS

| | | | |
|---|---|---|---|
| 7,110,880 B2 * | 9/2006 | Breed et al. .................... | 701/482 |
| 8,229,604 B2 * | 7/2012 | Villaume et al. ................. | 701/3 |
| 2007/0124035 A1 * | 5/2007 | Hasenfuss ....................... | 701/19 |
| 2007/0152804 A1 * | 7/2007 | Breed et al. .................... | 340/435 |
| 2007/0288132 A1 * | 12/2007 | Lam ................................ | 701/23 |
| 2008/0009985 A1 * | 1/2008 | Plishner ......................... | 701/23 |
| 2008/0059007 A1 * | 3/2008 | Whittaker et al. .................. | 701/2 |
| 2009/0157461 A1 * | 6/2009 | Wright et al. ..................... | 705/8 |
| 2010/0268445 A1 * | 10/2010 | Chen et al. ..................... | 701/119 |
| 2011/0118967 A1 * | 5/2011 | Tsuda ............................ | 701/117 |
| 2012/0148102 A1 | 6/2012 | Moriguchi et al. | |

FOREIGN PATENT DOCUMENTS

| | | |
|---|---|---|
| JP | 09-159469 | 6/1997 |
| JP | 2007-041751 | 2/2007 |
| JP | 2009-149194 | 7/2009 |
| JP | 2009-239585 | 10/2009 |
| JP | 2010-057015 | 3/2010 |
| JP | 2010-213044 | 9/2010 |

OTHER PUBLICATIONS

U.S. Appl. No. 13/614,153, filed Sep. 13, 2012, Kumabe.
U.S. Appl. No. 13/614,079, filed Sep. 13, 2012, Kumabe.
Office action dated Jan. 7, 2014 in corresponding Japanese Application No. 2011-211069.

* cited by examiner

*Primary Examiner* — Helal A Algahaim
*Assistant Examiner* — Shardul Patel
(74) *Attorney, Agent, or Firm* — Harness, Dickey & Pierce, PLC (57) ABSTRACT

A convoy travel apparatus enables a convoy travel of a subject vehicle by regularly transmitting convoy travel information including the latest measurement of GPS positioning coordinates and predetermined number of preceding measurements of GPS positioning coordinates. By receiving the convoy travel information from other vehicles, the convoy travel apparatus of the subject vehicle identifies a sender vehicle of a current convoy travel information based on a comparison between a travel locus generated from the current convoy travel information and a past travel locus generated from a convoy travel information previously received. The identification of the sender vehicle leads to the identification of the information from a leader vehicle to be followed in the convoy travel control of the subject vehicle, thereby enabling a convoy travel of the subject vehicle based on the identified information.

7 Claims, 7 Drawing Sheets

FIG. 5
STATE B

CONVOY TRAVEL APPARATUS

CROSS REFERENCE TO RELATED APPLICATION

The present application is based on and claims the benefit of priority of Japanese Patent Application No. 2011-211069, filed on Sep. 27, 2011, the disclosure of which is incorporated herein by reference.

TECHNICAL FIELD

The present disclosure generally relates to a convoy travel apparatus that enables a convoy travel of vehicles, specifically, without using a vehicle ID.

BACKGROUND

In a convoy travel of vehicles, in which vehicles form a convoy by exchanging information through vehicle-to-vehicle communication, a second vehicle and subsequent vehicles in the convoy follow a leader vehicle of the convoy which travels at the forward most position in the convoy. Further, the other vehicles in the convoy should quickly respond to the change of behavior of the subject vehicle. Therefore, all vehicles in the convoy regularly at short intervals transmit information required for the other vehicles such as a current position of the vehicle and the like (i.e., convoy travel information, hereinafter). Further, in a pre-convoy stage before organizing a convoy, vehicles may also transmit the convoy travel information regularly, so that a convoy of vehicles can easily/readily be organized with other vehicles.

In the convoy travel information, the current vehicle position of the information transmitting vehicle is included. However, a convoy of vehicles may be organized with many vehicles traveling in a relatively small area and the current position of the vehicle may include errors. Therefore, it may be difficult to accurately identify the vehicle that has transmitted the convoy travel information, based only on the current vehicle position. For overcoming such difficulty, a technique disclosed, in Japanese Patent Laid-Open No. 2009-239585 uses a sender vehicle ID included in the convoy travel information, clearly identifying the sender vehicle.

However, if the vehicle ID is included in the information and such information is transmitted, it may be a breach of security and/or privacy of the vehicle that transmitted the information, and may allow other entities to identify personal information, such as, who owns the vehicle.

SUMMARY

In an aspect of the present disclosure, the convoy travel apparatus includes: a subject vehicle position measurement unit for regularly having a measurement of satellite positioning coordinates of a subject vehicle. Further the apparatus includes a wireless communication unit for regularly transmitting convoy travel information of the subject vehicle and for regularly receiving from other vehicles the convoy travel information of the other vehicle which is also regularly transmitted. The convoy travel information includes travel locus information and information of the latest satellite positioning coordinates of the subject vehicle, and the travel locus information is either (a) a predetermined number of latest measurements of the satellite positioning coordinates of the subject vehicle measured by the subject vehicle position measurement unit or (b) a travel locus defined by the predetermined number of latest measurements of the satellite positioning coordinates of the subject vehicle.

Further, the convoy travel apparatus further includes a convoy travel control unit for performing convoy travel control of the subject vehicle based on the convoy travel information of the other vehicles received by the wireless communication unit, and also includes a sender vehicle identification unit. The sender vehicle identification unit identifies a sender vehicle transmitting a convoy travel information currently received from the other vehicles. The sender vehicle identification unit identifies a sender vehicle based on a comparison between the travel locus information included in the convoy travel information currently received and travel locus information previously received. The convoy travel control unit determines, based on the sender vehicle identified by the sender vehicle identification unit, the convoy travel information that is received from a forward vehicle to be followed by the subject vehicle, and performs the convoy travel control based on the determined convoy travel information.

In the present disclosure, the convoy travel information to be transmitted to the surrounding vehicles not only includes the current measurement of the satellite positioning coordinates but also includes the travel locus information, thereby enabling a vehicle receiving such convoy travel information to identify the sender vehicle transmitting the convoy travel information, based on a comparison between the travel locus information included in the convoy travel information and the travel locus information previously received. Further, based on the identification of the sender vehicle identified in the above-described manner, the convoy travel information from the to-be-followed vehicle is identified from among many sets of convoy travel information received from many surrounding vehicles, and such identified information is used to perform the convoy travel control. As a result, the convoy travel control is enabled without transmitting the vehicle ID.

The method for more practically comparing two or more travel locus information may be realized by the comparison between two travel loci. That is, the sender vehicle identification unit may perform a comparison of the travel locus information by comparing a current travel locus that is determined based on the travel locus information included in the current convoy travel information received from the other vehicles with a "past" travel locus that is determined based on the travel locus information previously received.

Further, when the travel locus information is made up from the predetermined number of measurements of the GPS positioning coordinates including the latest measurement, the comparison of the travel locus information may be performed as a direct coordinate comparison, between two sets of predetermined number of measurements of the GPS positioning coordinates, that is, for example, a comparison between two travel loci having four measurements (i.e., points) received just recently and received in the past.

When the subject vehicle is traveling in a convoy, or when the subject vehicle is approaching a convoy to join it, the subject vehicle may receive the convoy travel information from many vehicles. Even in such situation, based on the identification result of the sender vehicle by the sender vehicle identification unit, the convoy travel information from a forward vehicle that will be directly followed by the subject vehicle can be identified. That is, the convoy travel control unit identifies the convoy travel information transmitted by a forward vehicle that is directly followed by the subject vehicle based on an identification result of the sender vehicle by the sender vehicle identification unit, and performs the convoy travel control based on the identified convoy travel information.

Further, the convoy travel control unit controls the wireless communication unit to transmit the convoy travel information including a follower notice indicating a start of a following travel of the subject vehicle when the subject vehicle starts to perform the following travel to follow the forward vehicle.

Further, when the subject vehicle receives the convoy travel information including the follower notice while the subject vehicle is not in the convoy, it is determined that the subject vehicle has become a leader of the convoy and a variable convoy ID, which is different at every generation time, is generated, and the convoy travel information including the variable convoy ID is transmitted while the subject vehicle is leading the convoy.

The convoy ID generated in the above-described manner will be different each time it is generated, thereby preferably improving the security of the convoy ID.

Further, when the subject vehicle is a leader of a convoy, the subject vehicle transmits, from the wireless communication unit, the convoy travel information including the maximum allowable number of vehicles in the convoy and a currently-included number of vehicles in the convoy. On the other hand, when the subject vehicle in a non-convoy traveling state receives the convoy travel information including the maximum allowable number of vehicles and the currently-included number of vehicles, the convoy travel control unit determines whether the subject vehicle can join the convoy based on the received convoy travel information including the maximum allowable number of vehicles and the currently-included number of vehicles. In such manner, a vehicle currently not in a convoy can easily determine whether it can join the convoy.

Further, after determining that the subject vehicle can join the convoy, the convoy travel control unit identifies the convoy travel information from a vehicle having been traveling at a rear end position of the convoy based on an identification result of the sender vehicle by the sender vehicle identification unit, and performs a following travel control for following the rear end position vehicle based on the convoy travel information identified. Further, it transmits the convoy travel information including the follower notice. Then, when the convoy travel information received by the wireless communication unit includes the follower notice while the subject vehicle is the leader of the convoy, the convoy travel control unit increases by one the currently-included number of vehicles.

As described above, the currently-included number to be included in the convoy travel information may be correctly counted, by transmitting the follower notice from the joining vehicle and by incrementing the number upon receiving the notice.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

The present disclosure is described in the following with reference to the drawings.

Figure 1:
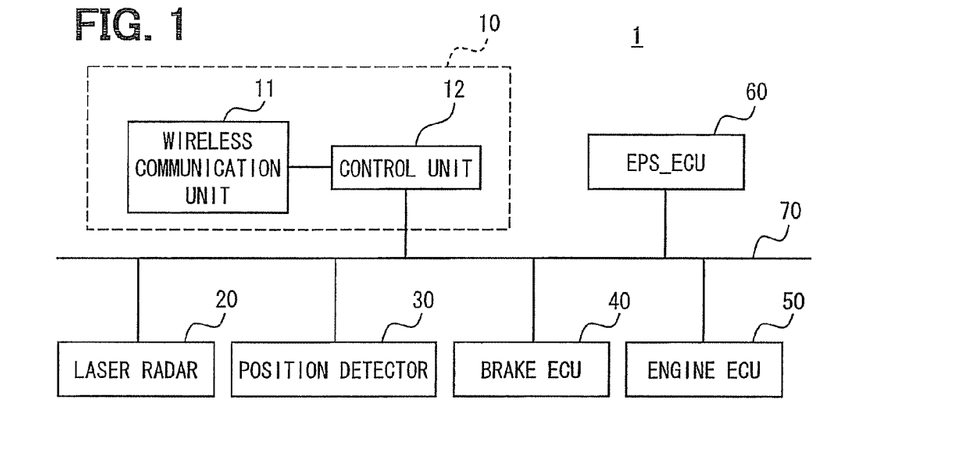
FIG. 1 is a block diagram of an in-vehicle convoy travel system of the present disclosure.

FIG. 1 is a block diagram of an in-vehicle convoy travel system 1 including a convoy travel apparatus 10. The in-vehicle convoy travel system 1 is disposed in a subject vehicle, and where multiple vehicles each having the in-vehicle convoy travel system 1 organize a convey of travel vehicles with the in-vehicle convoy travel system 1 (i.e., a travel of many vehicles organized as a convoy).

In addition to the convoy travel apparatus 10, the in-vehicle convoy travel system 1 includes a laser radar 20, a position detector 30, a brake ECU 40, an engine ECU 50, and an EPS_ECU 60, which are communicably coupled via a local area network (LAN) 70 based on a communication protocol such as a Controller Area Network (CAN).

The convoy travel apparatus 10 includes a wireless communication unit 11 and a control unit 12. The wireless communication unit 11 has a transmission and reception antenna (not illustrated), and, for example, wirelessly performs a vehicle-to-vehicle communication in a communication range of, for example, several hundred meters around the subject vehicle. Further, the electric wave used by the wireless communication unit 11 may be in a 700 MHz band. However, the wireless communication unit 11 may use other frequency bands such as 5.9 GHz. Further, information from the subject vehicle is broadcasted through a unidirectional communication (i.e., one-way communication).

The control unit 12 includes a well-known CPU and memories, such as ROM, RAM, EEPROM, as well as an input/output and a bus line (not illustrated) to coupled the components of the control unit 12. The control unit 12 performs a convoy travel control by controlling the brake ECU 40, the engine ECU 50, and the EPS_ECU 60, based on information acquired from other vehicles through the wireless communication unit 11 and based on information acquired from the laser radar 20, the position detector 30, the brake ECU 40, the engine ECU 50, and the EPS_ECU 60 via the in-vehicle LAN 70 of the subject vehicle.

The convoy travel control performed by the control unit 12 may be referred to as a convoy travel control unit in claims.

Further, the control unit 12 functions as a communication controller by controlling transmission and reception of information transmitted and received by the wireless communication unit 11. Under control of the control unit 12, the wireless communication unit 11 transmits convoy travel information, i.e., information of the subject vehicle, which is used respectively by other vehicles in the convoy for the convoy travel control of the vehicles. Furthermore, the control unit 12 performs a process that identifies a sender of the convoy travel information received by the wireless communication unit 11. Details of such process by the control unit 12 are described later. The control unit 12 may be referred to as a sender vehicle identification unit in claims.

The laser radar 20 is installed on a front end of the vehicle, and scans a front object in front of the vehicle by emitting a laser beam in a comparatively small predetermined angle range. The front object is detected based on an intensity of a reflection beam from the object above a predetermined level. Further, based on the emission direction of the laser beam, a relative direction of the front object is detected, and, based on the time between the emission and the reception of the laser beam, the distance to the front object is also detected. Further, the laser radar 20 performs a determination whether the front object is a forward vehicle that travels right in front of the subject vehicle (i.e., immediately ahead of the subject vehicle). Therefore, the laser radar 20 can regularly measure a distance from the subject vehicle to the forward vehicle. Further, the laser radar 20 may be replaced with a millimeter wave radar. Further, the control unit 12, instead of the radar 20, may perform a determination whether or not the front object is a leader vehicle.

The position detector 30 includes a Global Positioning System (GPS) receiver receiving the electric wave from a satellite of GPS, and regularly detects coordinates (i.e., GPS positioning coordinates hereinafter) of a position of the subject vehicle based on the electric wave received by the GPS receiver. The position detector 30 may be referred to as a subject vehicle position measurement unit in claims, and the GPS positioning coordinates may be referred to as satellite positioning coordinates in claims.

The brake ECU 40 uses a microcomputer as its main component, which includes CPU, ROM, RAM, backup RAM and the like, and acquires, for example, a signal indicating a vehicle speed, a forward/backward acceleration, and a lateral acceleration from a vehicle speed sensor and an acceleration sensor, and supplies the signal to the control unit 12. Further, based on instructions from the control unit 12, the brake ECU 40 controls brake actuators to control a vehicle speed (e.g., reduce vehicle speed).

The engine ECU 50 controls an engine torque generated by an engine (not illustrated) to accelerate and decelerate the subject vehicle based on instructions from the control unit 12. The EPS_ECU 60 acquires a signal indicating a steering torque and a steering angle from a torque sensor and a steering angle sensor, and supplies those signals to the control unit 12. Based on instructions from the control unit 12, the EPS_ECU 60 controls a motor that rotates a steering shaft of the subject vehicle.

The convoy travel control performed by the control unit 12 is described in detail. First, explanation of a basic concept of the convoy travel control in the present embodiment is provided with reference to FIG. 2. The convoy travel control in the present embodiment is performed according to four states of the subject vehicle: an initial state (State A), a convoy ready state (State B), a convoy enabling state (State C), and a convoy travel state (State D). The control unit 12 changes and keeps track of a state parameter that represents one of four states of the subject vehicle.

Figure 2:
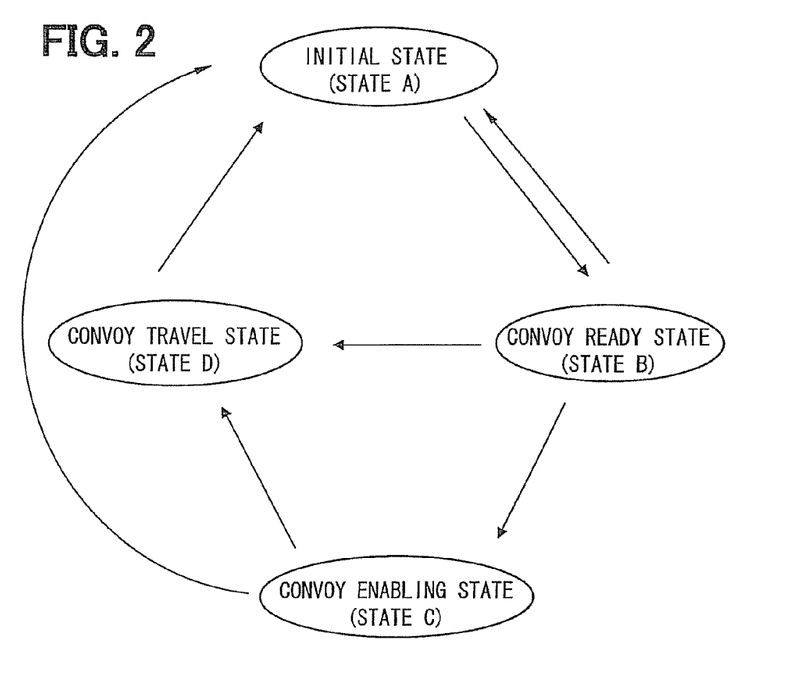
FIG. 2 is a state transition diagram of convoy travel control.

The processes performed in the four states are described in the following. Each vehicle, i.e., the subject vehicle and other vehicles, starts with the initial state (State A). Further, the vehicle (i.e., a control state of a vehicle) may transition to the initial state (State A) from each of the other states, that is, from the convoy ready state (State B), the convoy enabling state (State C), and the convoy travel state (State D).

Figure 3:
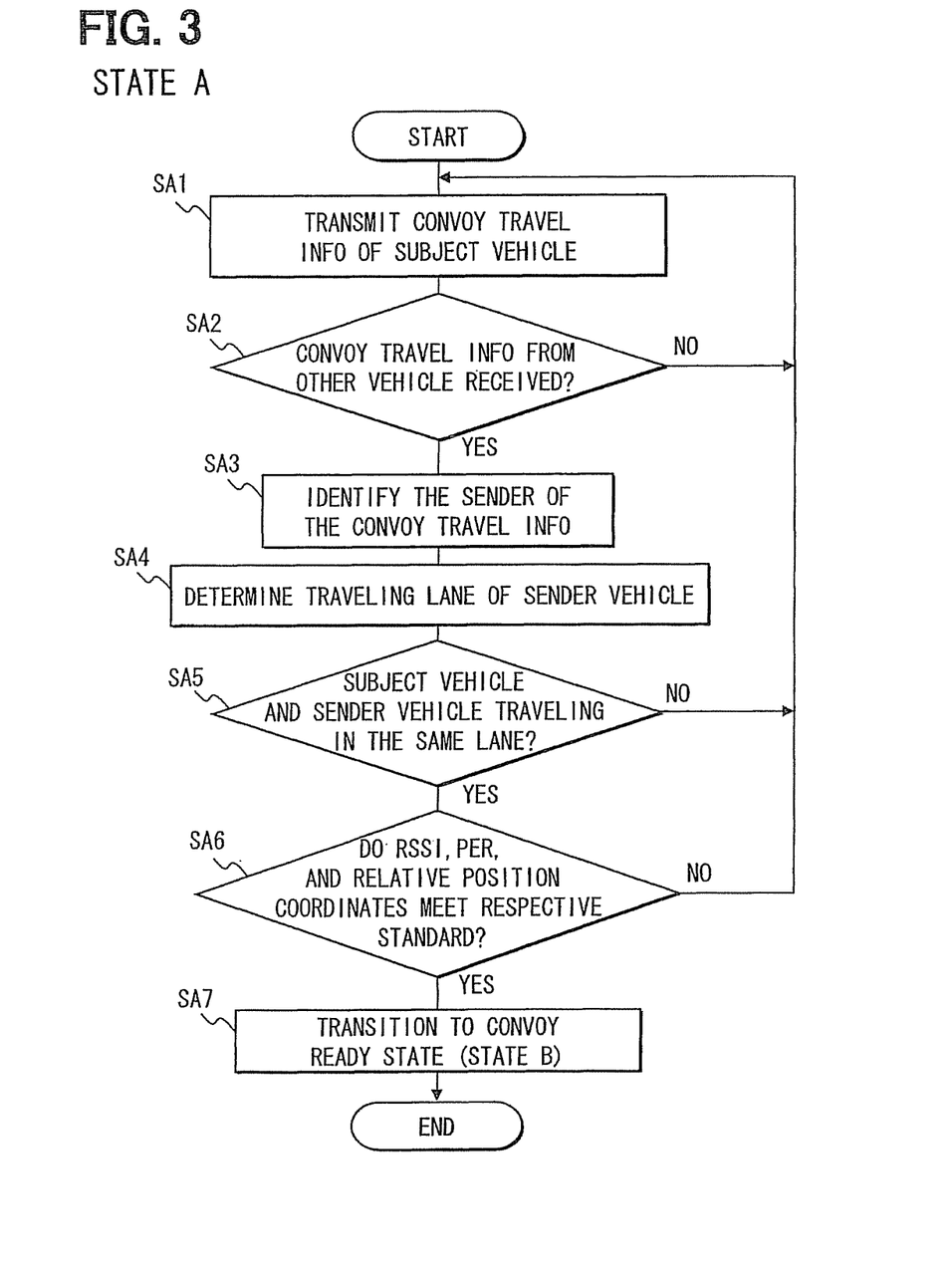
FIG. 3 is a flowchart of a process performed in an initial state (State A) by the in-vehicle convoy travel system.

When the subject vehicle is in the initial state (State A), it performs a process shown in FIG. 3. The subject vehicle, in SA1, transmits a convoy travel information of the subject vehicle from the wireless communication unit 11. The convoy travel information includes a predetermined number, such as four latest measurements of successively observed GPS positioning coordinates, as well as, vehicle speed and travel direction. Further, the convoy travel information may include information of the travel control and/or travel behaviors of the subject vehicle (e.g., information about the brake control). The GPS positioning coordinates are regularly acquired from the position detector 30, and the vehicle speed is acquired from the vehicle speed sensor through the brake ECU 40. The direction may be calculated from the locus of GPS positioning coordinates, or may be acquired from a geomagnetism sensor if the subject vehicle is equipped with one. The predetermined number of successively measured GPS positioning coordinates may be referred to as travel locus information in claims.

Though not included in the convoy travel information of the initial state (State A), the convoy travel information of the convoy travel state (State D) may include a whole convoy ID and a sub-convoy ID, as described later, and the convoy travel information may further include a currently-included number of vehicles and the maximum number of vehicles in the convoy.

In SA2, the process determines whether convoy travel information from another vehicle has been received. If one or more vehicles around the subject vehicle are equipped with the in-vehicle convoy travel system 1, the subject vehicle receives the convoy travel information from such vehicles (i.e., other vehicles) because those vehicles can transmit the convoy travel information. If convoy travel information was not received from the other vehicle (SA2: No) the process returns to SA1. If convoy travel information was received (SA2, YES), the process proceeds to SA3. The other vehicle that transmitted the convoy travel information received by the subject vehicle is referred to as a sender vehicle hereinafter.

In SA3, the process identifies the sender vehicle that transmitted the convoy travel information received in SA2. Specifically, the process generates a travel locus of the sender vehicle from multiple measurements of GPS positioning coordinates included in the convoy travel information from the sender vehicle. The process then compares the generated travel locus with a past travel locus generated from the convoy travel information that was previously received prior to the reception of the convoy travel information currently received and is stored in memory. Based on the matching degree of two travel loci, the process identifies the sender vehicle of the convoy travel information currently-received.

Further, when performing a convoy travel, convoy travel information is received from each of the multiple vehicles regularly. From among all the convoy travel information received, the past travel locus used in the above comparison has at least one measurement time that is the same as the GPS positioning coordinates as the current travel locus. That is, the current travel locus and the past travel locus are chosen to have substantially the same measurement time except for the end point of the travel locus. Such situation is described in detail in the following.

Figure 4:
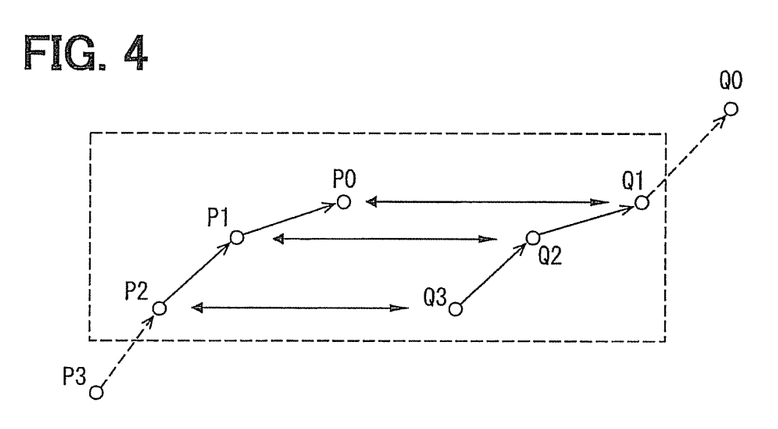
FIG. 4 is an illustration of a comparison method of travel loci of two vehicles.

With reference to FIG. 4, the comparison method of two travel loci respectively having four measurement points is described in the following. The past travel locus used for comparison is made up from three points, excluding the oldest measurement point from the four successively measured points. The three GPS positioning coordinate points used for comparison are P2, P1, P0. The current travel locus used for comparison is also made up from three points, the GPS positioning coordinate points of Q3, Q2, Q1 of FIG. 4, excluding the latest measurement point. If the GPS positioning coordinate points P0 to P3 and Q0 to Q3 are based on the information successively transmitted from the same vehicle, the points P0 and Q1, the points P1 and Q2, the points P2 and Q3 respectively represent the same GPS positioning coordinate points of the same vehicle measured respectively at the same time, as indicated by both-headed arrows in FIG. 4. Therefore, as circled by a dotted line square in FIG. 4, a travel locus P2-P1-P0 and a travel locus Q3-Q2-Q1 substantially match with each other if they are from the same vehicle. If, on the other hand, two loci are from different vehicles, the matching degree of two loci is less.

Therefore, based on the matching degree of two travel loci, the position of the sender vehicle of the convoy travel information currently-received can be identified. The matching degree mentioned above represents both of the degree of matching of two travel locus shapes as well as the degree of matching of two travel locus positions. Therefore, by regularly identifying the sender vehicle based on the travel locus, the sender vehicle transmitting the convoy travel information is identified in terms of its whereabouts in the past (i.e., its travel locus history), even when the latest GPS positioning coordinate points respectively received from the multiple vehicles around the subject vehicle are very close to each other (i.e., even when one travel locus and the other are very similar at one measurement points or another). Further, when it is determined that the degree of matching of a travel locus with any one of the past travel loci is below a certain level, such vehicle is determined as a newly-joining vehicle just recently coming into the communication area of the subject vehicle.

With continuing reference to FIG. 3, in SA4, based on the GPS positioning coordinates of both vehicles and independent sensor information, the process determines whether the sender vehicle identified in SA3 is traveling in the same lane as the subject vehicle. For instance, when it is determined (i) that the sender vehicle is in front of the subject vehicle at or within a predetermined distance based on the GPS positioning coordinates and (ii) based on the detection of the laser radar 20 it is determined that a vehicle, substantially within the predetermined distance, is right-ahead of or immediately ahead of the subject vehicle, the subject vehicle and the sender vehicle are determined to be traveling in the same lane.

When the determination in SA4 is that the subject vehicle and the sender vehicle are traveling in the same lane, SA5 is YES and the process proceeds to SA6. Otherwise SA5 is NO, and the process returns to SA1.

In SA6, the process determines whether a reception signal strength (RSSI) and packet error rate (PER) of the convoy travel information received in SA2 from the sender vehicle respectively satisfy a certain standard for each of those indices. Specifically, when the RSSI is greater than a RSSI threshold, it is determined to satisfy the standard, and, when the PER is less-than or equal to a PER threshold, it is determined to satisfy the standard. It is preferred to have a higher RSSI and a lower PER.

The process also determines whether relative position coordinates satisfy a certain standard. The relative position coordinates are calculated as coordinate differences between the latest positions of the subject vehicle and the sender vehicle. When a distance represented by the coordinate differences is equal to or under a threshold standard distance, the relative position coordinates are determined as satisfying the standard.

If the RSSI, the PER, and the relative position coordinates satisfy respective standards, the process in SA6 is determined as affirmative, which indicates that a vehicle close to the subject vehicle is transmitting the convoy travel information, and the information transmitted from the vehicle is received in a high reception quality.

When the process in SA6 is determined as affirmative, the process proceeds to SA7. On the other hand, when the process in SA6 is determined as negative, that is, when at least one of the RSSI, the PER, and the relative position coordinates is not a standard, the process returns to SA1.

Figure 5:
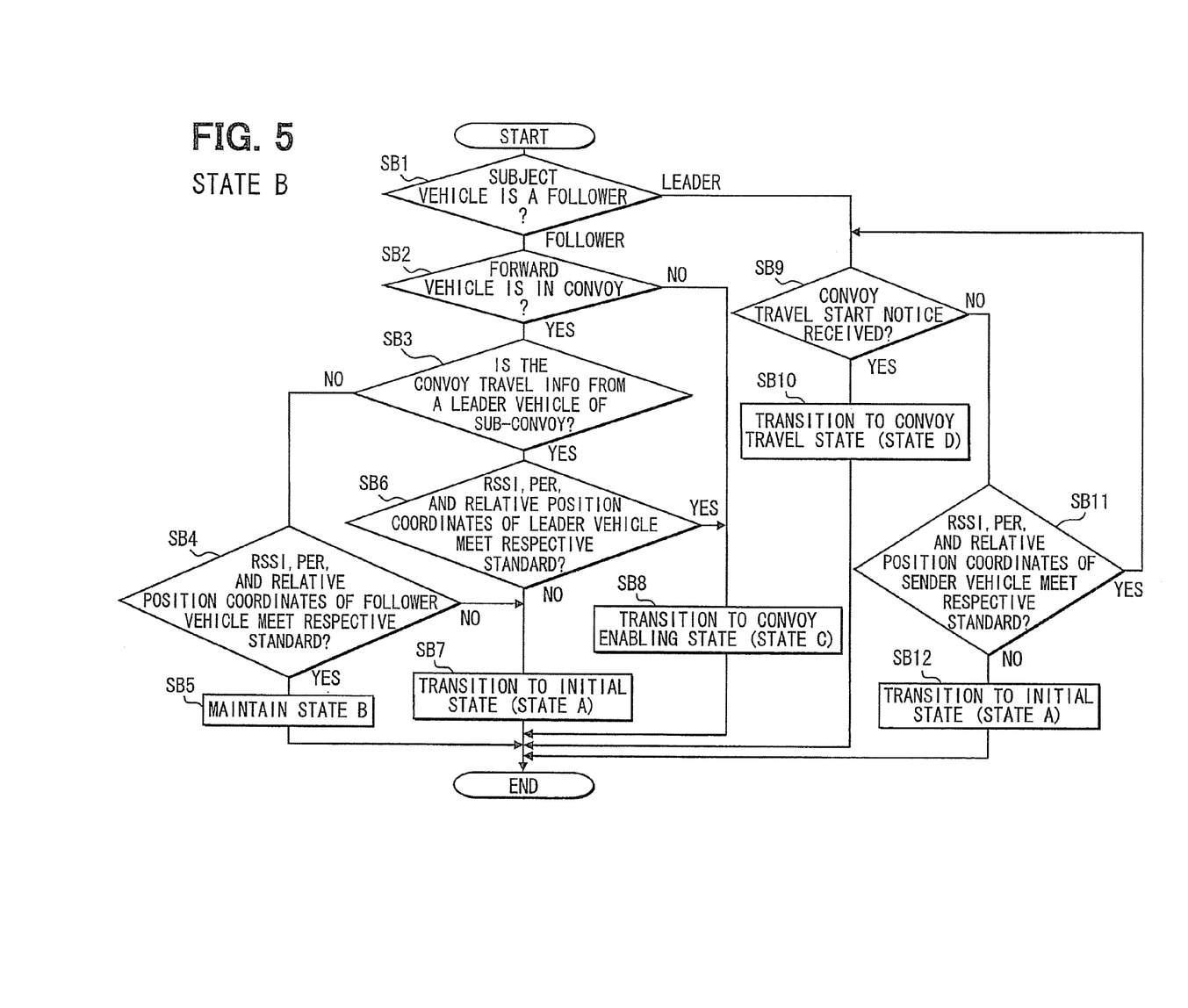
FIG. 5 is a flowchart of a process performed in a convoy ready state (State B) by the in-vehicle convoy travel system.

In SA7, the state parameter is changed to the convoy ready state (State B). After transiting to the convoy ready state (State B) by the execution of SA7, a process shown in FIG. 5 is performed.

The process executed in the convoy ready state (State B) is described with reference to FIG. 5. The subject vehicle can transition to the convoy ready state (State B) only from the initial state (State A) as shown in FIG. 2, and, when the subject vehicle transitions from the initial state (State A) to the convoy ready state (State B), the subject vehicle should not be in any convoy and the subject vehicle, which is joining a convoy, has identified at least one sender vehicle. The subject vehicle may be referred to as the joining vehicle hereinafter.

A convoy can be organized by the joining vehicle and the sender vehicle in either case that the joining vehicle leads (i.e., is in front of) the sender vehicle or the sender vehicle leads the joining vehicle. Therefore, whether to transition from the initial state (State A) to the convoy ready state (State B) is determined without identifying which one of the joining vehicle and the sender vehicle is in front of the other. However, the process of organizing a convoy is respectively different when the joining vehicle leads the sender vehicle and when the sender vehicle leads the joining vehicle.

Therefore, in SB1, the process determines whether the joining vehicle (i.e., the subject vehicle) is following the sender vehicle. Such determination is performed based on the latest GPS positioning coordinates of the joining vehicle and the GPS positioning coordinates of the sender vehicle, which are included in the convoy travel information received from the sender vehicle.

When the GPS positioning coordinates of the joining vehicle are behind the travel direction of the GPS positioning coordinates of the sender vehicle, it is determined that the joining vehicle is following the sender vehicle (i.e., the subject vehicle will be traveling as a follower vehicle in the convoy, which may also be referred to as a "following vehicle"), and the process proceeds to SB2.

When the GPS positioning coordinates of the joining vehicle are in front of the travel direction of the GPS positioning coordinates of the sender vehicle, it is determined the joining vehicle will become a leader vehicle in a convoy, and the process proceeds to SB9.

When the subject vehicle (i.e., the joining vehicle) is a follower vehicle of the sender vehicle, the process in SB2, determines whether the sender vehicle (i.e., a forward vehicle in the following) is traveling in a convoy. The convoy travel information from the forward vehicle may include a convoy ID. Based on the inclusion of such ID in the convoy travel information, the determination in SB2 is performed. Thus, if the convoy travel information of the forward vehicle includes the whole convoy ID, the forward vehicle is in a convoy (SB2, YES), and the process proceeds to SB3, and if the convoy travel information does not include the whole convoy ID, the forward vehicle is not in a convoy (SB2, NO), and the process proceeds to SB8.

When SB3 is performed, the forward vehicle is a rearmost vehicle traveling in the convoy. In the present embodiment, the convoy is organized by not only using the behavior of a right ahead vehicle (i.e., a vehicle traveling immediately in front of the subject vehicle) but also using the information transmitted by a convoy leader vehicle (i.e., a leader vehicle of the convoy). Therefore, in SB3, it is determined whether the convoy travel information is received from a leader vehicle of the convoy.

In the present embodiment, contents of the convoy travel information are respectively different in the information from the leader vehicle of the sub-convoy and in the information from the follower vehicle in the convoy. For instance, only the convoy travel information from the leader vehicle includes the maximum allowable number of vehicles in the convoy and the currently-included number of vehicles in the convoy. Therefore, whether the convoy travel information of the leader vehicle of the sub-convoy has been received is determined based on the inclusion of those information (i.e., the maximum allowable number and the currently-included number of vehicles) in the convoy travel information. When such determination is negative, the process proceeds to SB4.

In SB4, the process determines whether the RSSI, the PER, and the relative position coordinates from the follower vehicle of the sub-convoy satisfy the respective standards. Such determination is performed for the purpose of determining whether to further maintain the convoy ready state (State B).

When all of the RSSI, the PER, and the relative position coordinates satisfy the standards (SB4, YES), the process proceeds to SB5. Then, in SB5, it is determined to further maintain the convoy ready state (State B). In such case of further maintaining the convoy, the process thereafter returns to SB1. On the other hand, if at least one of the RSSI, the PER, and the relative position coordinates do not satisfy the standards (SB4, NO) the process proceeds to SB7.

When the convoy travel information is from the leader (SB3, YES), the process proceeds to SB6 and determines whether the RSSI, the PER, and the relative position coordinates in the convoy travel information from the leader vehicle of the sub-convoy satisfy the respective standards. If the RSSI, the PER, and the relative position coordinates satisfy the respective standards (SB6, YES), the process proceeds to SB8, and if no (SB6, NO), the process proceeds to SB7.

In SB7, the state parameter is changed to the initial state (State A). In such case, the process in FIG. 3 is performed.

In SB8, the process changes the state parameter to the convoy enabling state (State C). The state parameter is changed to the convoy enabling state (State C) when the subject vehicle is a follower vehicle of the sender vehicle (i.e., forward vehicle). If the forward vehicle of the subject vehicle is traveling in a convoy, the state parameter is changed to the convoy enabling state (State C) only when the convoy travel information from the leader vehicle of the sub-convoy is received in a high reception quality. The convoy enabling state (State C) is provided in FIG. 6.

When the process in SB1 determines that the subject vehicle is a leader vehicle in SB1, then, in SB9, the process determines whether a convoy travel start notice has been received from a following vehicle. The convoy travel start notice is a notice sent by the following vehicle in SC7 of FIG. 6 indicating that the following vehicle is following the subject vehicle (i.e., forward vehicle) and has started the convoy travel. When it is determined to have received the convoy travel start notice, the process proceeds to SB10.

In SB10, the process changes the state parameter to the convoy travel state (State D) indicating that the subject vehicle is traveling in a convoy. In other words, when the subject vehicle is a leader vehicle of a convoy and receives the convoy travel start notice from a following vehicle, the subject vehicle transitions to the convoy travel state (State D).

When a convoy travel start notice has not been received, the process in SB11, just like SA6 of FIG. 3, determines whether the RSSI, the PER, and the relative position coordinates of the latest convoy travel information received from the sender vehicle satisfy the respective standards. Such determination is performed for the purpose of determining whether the convoy ready state (State B) should/can be further maintained. When all of the RSSI, the PER, and the relative position coordinates satisfy the standards (SB11, YES), the process returns to SB9. On the other hand, when at least one parameter does not satisfy the standard (SB11, NO), the process proceeds to SB12.

In SB12, the process changes the state parameter to the initial state (State A). In such case, the process mentioned above with reference to FIG. 3 will be performed.

Figure 6:
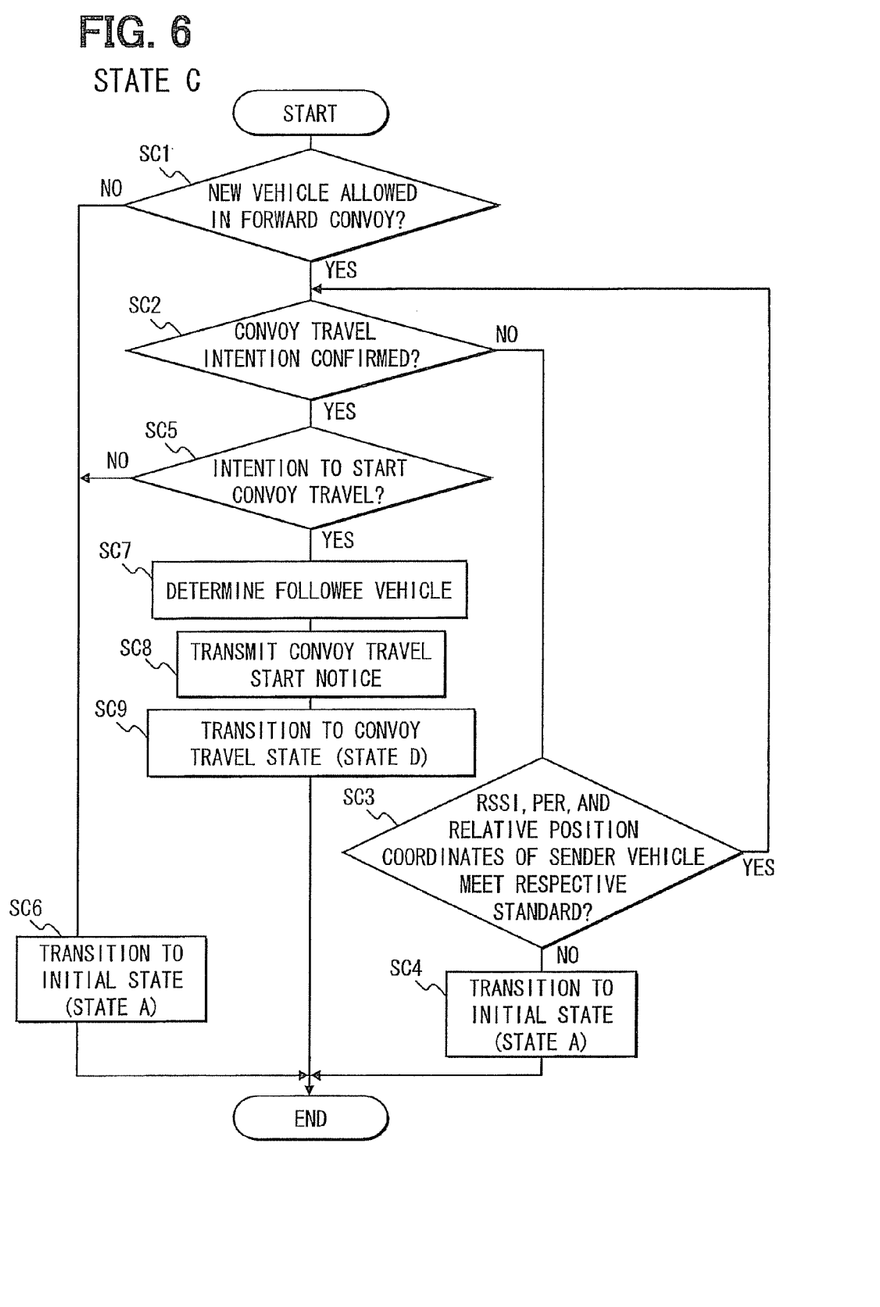
FIG. 6 is a flowchart of a process performed in a convoy enabling state (State C) by the in-vehicle convoy travel system.

With reference to FIG. 6, the process executed in the convoy enabling state (State C) is described. According to the convoy ready state (State B), when the subject vehicle is the following vehicle, the subject vehicle can transition to the convoy enabling state (State C). While the subject vehicle is in the convoy enabling state (State C), the driver receives acknowledgement that the vehicle is enabled to travel in a convoy, either continuously or periodically. More practically, such acknowledgement of enablement of the convoy travel provided for the driver may, for example, appear on a display device positioned in a sight of the driver.

In SC1, the process determines whether a convoy traveling in front of the subject vehicle has room for accommodating a new vehicle. In other words, whether or not the maximum allowable number of the convoy has been reached is determined. Such determination may be made a number of ways. For instance, the subject vehicle may transition to the convoy enabling state (State C), when the forward vehicle is not in a convoy (SB2 of FIG. 5 is NO), in which case the forward vehicle is traveling solo, leading to the determination that the maximum allowable number has not been reached.

Figure 7:
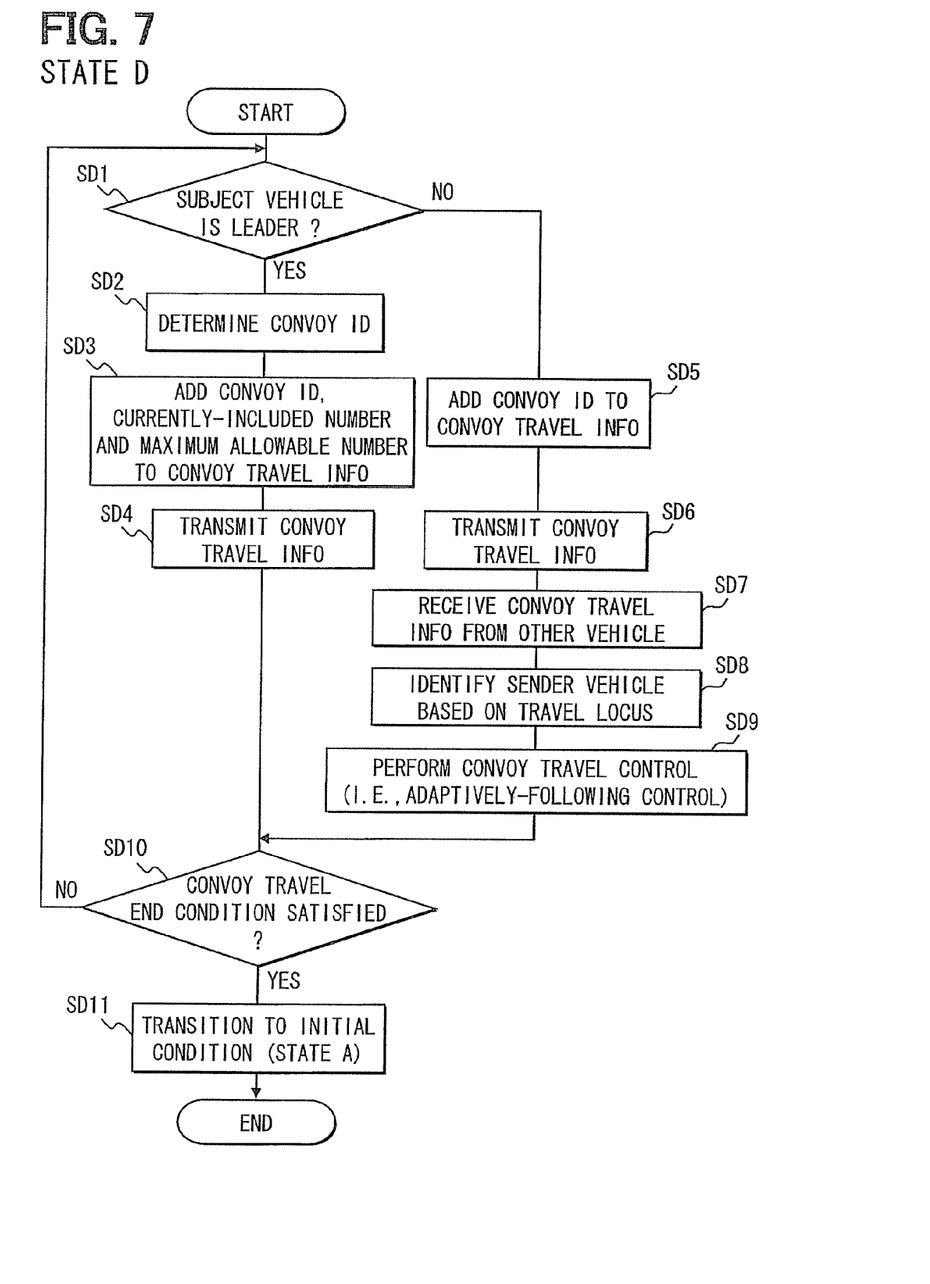
FIG. 7 is a flowchart of a process performed in a convoy travel state (State D) by the in-vehicle convoy travel system.

Also, the subject vehicle may transition to the convoy enabling state (state C), when the RSSI. PER, and the relative position coordinates of the leader is okay (SB6 of FIG. 5 is YES), in which case the information from the leader vehicle of the sub-convoy was received in high reception quality. The leader vehicle of such sub-convoy transmits convoy travel information that includes the maximum allowable number and the currently-included number of vehicles in the vehicle, as shown in FIG. 7. Thus, based on the maximum allowable number and the currently-included number of vehicles in the received convoy travel information from the leader vehicle of the sub-convoy, it is determined whether the sub-convoy has room for a new vehicle.

When it is determined in SC1 that there is no room for a new vehicle, no vehicle can join the convoy traveling in front of the subject vehicle (SC1, NO). Therefore, the process proceeds to SC6, and finishes the convoy enabling state (State C), and the vehicle transitions to the initial state (State A). On the other hand, the process proceeds to SC2 when it is determined that there is room for a new vehicle in the convoy (SC1, YES).

In SC2, the process determines whether the driver's intention regarding the convoy travel has been confirmed. More practically, it is determined whether the driver has performed a convoy travel start instruction operation (e.g., a convoy travel start button is pressed) or whether the driver has performed a convoy travel refusal instruction operation. When the driver has issued the convoy travel start instruction (SC2, YES), the process proceeds to SC5, and when the convoy travel refusal instruction operation is issued (SC2, NO), the process proceeds to SC3.

SC3 determines whether the RSSI, the PER, and the relative position coordinates in the convoy travel information received from the sender vehicle satisfy the respective standards, just like SB11 of FIG. 5. Such determination is to determine whether the convoy enabling state (State C) should be further maintained. When the RSSI, the PER, and the relative position coordinates all satisfy the standards (SC3, YES), the process returns to SC2. On the other hand, when at least one of the above does not satisfy the standard (SC3, NO), the process proceeds to SC4.

In SC4, the process changes the state parameter to the initial state (State A). In such case, the process in FIG. 3 is performed.

When the convoy travel intention of the driver has been confirmed in SC2, the process proceeds to SC5. In SC5, the process determines whether the driver's intention of the convoy travel confirmed in above-mentioned SC2 is an intention to start the convoy travel or a refusal. If such determination in SC5 is negative, that is, if the driver's intention was the refusal of the convoy travel, the process proceeds to SC6. In SC6, the process changes the state parameter to the initial state (State A). In such case, the process in FIG. 3 is performed.

On the other hand, the process proceeds to SC7 when the intention is to start convoy travel (SC5, Yes). In SC7, the process determines an immediate (i.e., right) ahead vehicle as a followee vehicle (or a forward vehicle), which is followed by the subject vehicle. Further, which vehicle is the right ahead vehicle is determined based on the identification result in SA3. Alternatively, the sender vehicle may also be identified in SC7 in the same manner as SA3. In SC8, the process transmits the convoy travel information that includes the convoy travel start notice. The followee vehicle (i.e., the vehicle followed by a following vehicle) can identify that the vehicle transmitting the convoy travel start notice is a right behind vehicle based on the predetermined number of GPS positioning coordinates included in the convoy travel information.

The process proceeds to SC9 after having transmitted the convoy travel start notice in SC8, and the process changes the state parameter to the convoy travel state (State D).

The process executed in the convoy travel state (State D) is described in the following. FIG. 7 illustrates the convoy travel information transmitted by each vehicle in the convoy travel state (State D). More practically, the contents of the convoy travel information transmitted by each vehicle in the convoy travel state (State D) as well as how to organize a sub-convoy.

At first, in SD1, the subject vehicle determines whether it is a leader vehicle. When the subject vehicle is a leader vehicle, the process proceeds to SD2, and, when the subject vehicle is a following vehicle, the process proceeds to SD5, where the following vehicle is a vehicle that is not the leader vehicle in a convoy.

A situation in which the subject vehicle is a leader vehicle is described in the following.

In SD2, the convoy ID is determined. Since in the first round of execution of the State D process after the convoy formation, the convoy ID has not yet generated. Therefore, the convoy ID is generated. On the other hand, in the second or later round of execution of SD2 of the State D process after the convoy formation, the convoy ID has already been generated. Therefore, the already-generated convoy ID is re-used/maintained. The convoy ID is generated according to a generation rule that controls the ID to have a different number each time of generation and to have at least a predetermined number of digits. Such generation improves security and may prevent possible mix up with an ID assigned to another convoy. For example, the ID may be generated based on positioning coordinates at a time of starting the convoy travel, a time of starting the convoy travel, a randomly generated text string, and/or a combination of those numbers and strings.

In SD3, the process adds the convoy ID of SD2, the currently-included number of vehicles, and the maximum allowable number of vehicle to the convoy travel information of the subject vehicle which has the information as the initial state (i.e., before the formation of the convoy). The maximum allowable number represents the maximum number of vehicles to be included in the convoy, in which the subject vehicle is serving as a leader vehicle. The maximum allowable number is a predetermined number based on the capacity of the wireless communication unit 11 of the subject vehicle. For example, when the capacity of the wireless communication unit 11 of the subject vehicle allows communication with three vehicles behind the subject vehicle, the maximum allowable number is set to 4, since the number includes the subject vehicle itself. The currently-included number of vehicles is incremented by 1 when the subject vehicle receives a convoy travel start notice from a vehicle that has newly joined the convoy to follow the subject vehicle.

In SD4, the process transmits the convoy travel information that has the convoy ID and the like added thereto in SD3 via the wireless communication unit 11. The process proceeds to SD10 to be described later.

A situation in which the subject vehicle is a following vehicle is described in the following. In SD5, the process adds, to the convoy travel information having the same items as the one in the initial state (State A), the convoy ID. The following vehicle (i.e., the subject vehicle in current situation) acquires the convoy ID by receiving the convoy travel information transmitted from a leader vehicle in SD4.

In SD6, the process transmits the convoy travel information having the convoy ID added thereto in SD5 from the wireless communication unit 11. In SD7, the process receives the convoy travel information transmitted from other vehicle(s). Specifically, the process may receive convoy travel information from multiple vehicles in the convoy, and may also receive convoy travel information from a vehicle outside of the convoy in which the subject vehicle is a part off.

In SD8, the process generates the travel locus from each of the convoy travel information respectively having the predetermined number of measurements of GPS pinpointing coordinates. The process then compares the travel locus generated with the travel locus stored in the memory (i.e., past travel locus), and determines a relative position of the sender vehicle regarding each of many sets of the convoy travel information, which may or may not be in the convoy, in order to identify the sender vehicle.

In SD9, based on the identification results of the sender vehicle(s) in SD8, the process identifies the convoy travel information transmitted by the right ahead vehicle of the subject vehicle and the convoy travel information transmitted by the leader vehicle of the convoy in which the subject vehicle is a part of. Subsequently, the convoy travel control of the subject vehicle is performed. Specifically, the convoy travel control may more practically be defined as a combination of (i) a following travel control for following the right ahead vehicle and (ii) a travel control for maintaining a convoy formation based on the convoy travel information from the convoy leader vehicle and from the other vehicle(s). The process proceeds to SD10 after performing SD9.

In SD10, the process determines whether a convoy travel end condition is satisfied. The convoy travel end condition may be, for example, an override operation performed by the driver, a move of the subject vehicle to another lane, an input operation indicating an intention of ending the convoy travel, or the like. The override operation is an operation by the driver operating the vehicle that generates a behavior that is in conflict with a behavior determined by an adaptively-following travel control of the vehicle. For example, when a behavior determined by the adaptively-following travel control of a vehicle is an acceleration of the vehicle, a braking operation by the driver would be an override operation.

When determination in SD10 is negative, the process returns to SD1. On the other hand, when determination in SD10 is affirmative, the process proceeds to SD11.

In SD11, the process changes the state parameter to the initial state (State A). In such case, the process performs the process of FIG. 3.

Figure 8:
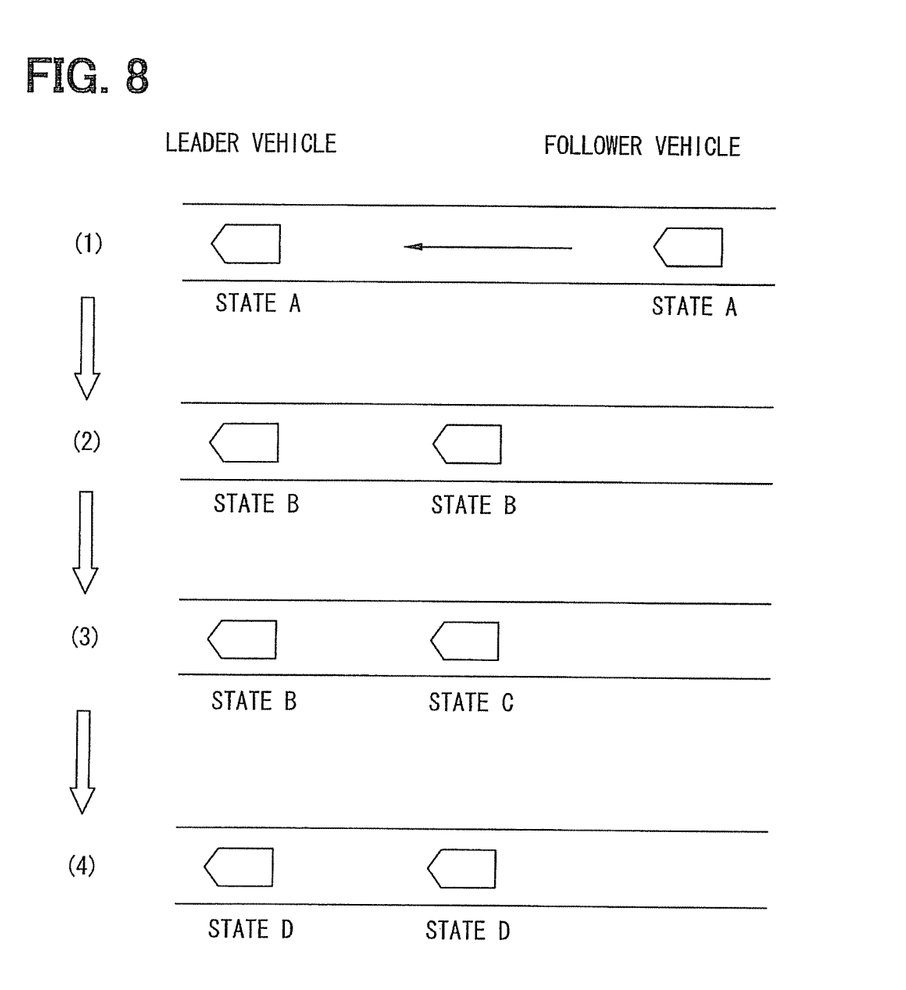
FIG. 8 is an illustration of a formation of a convoy.

FIG. 8 is an illustration of a formation of a convoy per the state processes described in FIGS. 3 to 7, as shown in (1)-(4) of FIG. 8. Per (1) of FIG. 8, two vehicles are traveling in the same lane, but separately (i.e., not in a convoy). In (1) the distance between the two vehicles may be great such that the information transmitted by each of the vehicles (SA1) may not be received by the other (SA2, NO). Therefore, the two vehicles remain in the initial state (State A).

As the distance between the two vehicles decreases, as shown in (2) of FIG. 8, the two vehicles may respectively exchange information with one another in a high communication quality, such that SA2 and SA6 of FIG. 3 are both affirmative. Further, since the two vehicles are traveling in the same lane, both vehicles transition to the convoy ready state (State B), as shown in (2) of FIG. 8.

Per SB1, the first vehicle is identified as a leader vehicle and the second vehicle is a follower vehicle. The follower vehicle determines that the forward vehicle of the follower vehicle (i.e., the leader vehicle) has no following vehicle (SB2, NO), and the following vehicle transitions to the convoy enabling state (State C) as shown in FIG. 8 (3). However, at a time when the following vehicle transitions to the convoy enabling state (State C), the forward vehicle (i.e., the leader vehicle) still stays in the convoy ready state (State B), as it awaits for a convoy travel start notice (SB9).

After confirmation of the driver of the following vehicle confirms intention to start the convoy travel and the following vehicle transmits the convoy travel start notice, the following vehicle transitions to the convoy travel state (State D). Once, the forward vehicle (i.e., the leader vehicle) receives the convoy travel start notice (SB8, YES), the forward vehicle also transitions to the convoy travel state (State D), as shown in FIG. 8 (4).

According to the present embodiment, each of the vehicles transmits to the surrounding vehicles the convoy travel information that include the latest measurement of the GPS pinpointing coordinates and the predetermined number of latest measurements of the GPS pinpointing coordinates. Upon receiving the convoy travel information from other vehicle(s), the subject vehicle identifies the sender vehicle transmitting the convoy travel information currently received based on a comparison of two travel loci, that is, the travel locus generated from the predetermined number of GPS positioning measurements (i.e., coordinates) and the travel locus generated from the convoy travel information currently received. In other words, the sender vehicle transmitting the convoy travel information is identified without using the vehicle ID.

The sender vehicle identified is further used to determine the convoy travel information of the forward vehicle that should be followed for the formation of the convoy. Therefore, even in a situation where the convoy travel information is receivable from many other vehicles, those other vehicles may transmit the convoy travel information without including the sender vehicle's ID, for allowing the subject vehicle to identify the forward vehicle to be followed in the convoy (i.e., to identify a vehicle transmitting the convoy travel information for the convoy travel).

Although the present disclosure has been fully described in connection with the preferred embodiment thereof with reference to the accompanying drawings, it is to be noted that various changes and modifications will become apparent to those skilled in the art.

For instance, in the above-described embodiment, the convoy travel information to be transmitted includes the predetermined number of latest measurements of the GPS pinpointing coordinates, for allowing the receiver to generate the travel locus. However, the travel locus may be generated on the sender's side, and the generated travel locus may be transmitted together with the latest measurement (i.e., one measurement) of the GPS pinpointing coordinates.

Further, a determination scheme that uses both of the RSSI and the PER respectively as a determination index in SA6. SB4, 6, 11, and SC3 in the above-described embodiment may be modified to use only one of the RSSI and the PER.

Further, a state transition scheme that prohibits a transition to the convoy travel state (State D) without confirmation of the driver's intention in the above-described embodiment (FIG. 6) may be modified to allow an automatic state transition to State D upon determining a predetermined continuation period of the convoy enabling state (State C).

Further, the state transition condition in the above-described embodiment, requiring the two vehicles staying in the same lane, may be modified, or may be omitted. In such case, the vehicles in different lanes may form a convoy. Therefore, two or more vehicles may be considered as a convoy formation object vehicle in some cases. In such a situation of having multiple convoy formation object vehicles, a predetermined rule may be employed for automatically reducing the number of object vehicles to only one vehicle. Further, the object vehicle may be chosen by the driver of the subject vehicle. The automatic selection of the convoy formation object vehicle may be, for example, realized by using a combination of two conditions, that is, the first condition of same lane traveling and the second condition of the inter-vehicle distance between two vehicles. The automatic selection is performed based on an assumption that there is a room for a new vehicle in the convoy.

Further, as a transition condition to transition to the convoy ready state (State B), a condition of having no vehicle between the sender vehicle identified in SA3 and the subject vehicle may be additionally used, in addition to the condition in the above embodiment, that is, the affirmative determinations in all of SA2, SA5, SA6 of FIG. 3.

In such a case, having no vehicle between the sender vehicle and the subject vehicle may be determined, for example, by comparing the two different measurements of an inter-vehicle distance, that is, comparison between (i) the measurement of a distance as the difference of GPS positioning coordinates of the sender vehicle and the subject vehicle and (ii) the measurement of a distance to the forward vehicle by using a laser radar of the subject vehicle. When two measurements substantially agree, it may be determined as having no vehicle therebetween.

Such changes and modifications are to be understood as being within the scope of the present disclosure as defined by the appended claims.

What is claimed is:

1. A convoy travel apparatus disposed in a subject vehicle that is equipped with a position measurement unit for regularly having a measurement of satellite positioning coordinates of the subject vehicle, the convoy travel apparatus comprising: a wireless communication unit regularly transmitting convoy travel information of the subject vehicle, the convoy travel information including latest satellite positioning coordinates of the subject vehicle and travel locus information made from one of (a) a predetermined number of latest measurements of the satellite positioning coordinates of the subject vehicle and (b) a travel locus defined by the predetermined number of latest measurements of the satellite positioning coordinates of the subject vehicle measured by the position measurement unit; a convoy travel control unit performing convoy travel control of the subject vehicle based on the convoy travel information from other vehicles received by the wireless communication unit; and a sender vehicle identification unit identifying a sender vehicle transmitting a convoy travel information currently received by the wireless communication unit, based on a comparison between the travel locus information included in the convoy travel information currently received and the travel locus information previously received, wherein the convoy travel control unit determines, based on the sender vehicle identified by the sender vehicle identification unit, the convoy travel information transmitted by a forward vehicle to be followed by the subject vehicle, and performs the convoy travel control based on the convoy travel information of the forward vehicle.

2. The convoy travel apparatus of claim 1, wherein the sender vehicle identification unit performs a comparison of the travel locus information by comparing a current travel locus that is determined based on the travel locus information included in the convoy travel information currently received from other vehicles with a travel locus that is determined based on the travel locus information previously received.

3. The convoy travel apparatus of claim 1, wherein the convoy travel control unit identifies the convoy travel information transmitted by the forward vehicle that is directly followed by the subject vehicle based on an identification result of the sender vehicle by the sender vehicle identification unit, and performs the convoy travel control based on the convoy travel information from the forward vehicle.

4. The convoy travel apparatus of claim 3, wherein the convoy travel control unit controls the wireless communication unit to transmit the convoy travel information of the subject vehicle to include a follower notice indicating a start of a following travel of the subject vehicle when the subject vehicle starts to perform a following travel control to follow the forward vehicle.

5. The convoy travel apparatus of claim 1, wherein the convoy travel control unit identifies the subject vehicle as a leader of a convoy and a variable convoy ID that is different at every generation time is generated, when the subject vehicle is not in a convoy and receives the convoy travel information that includes a follower notice indicating a start of a following travel of the sender vehicle, and the convoy travel information of the subject vehicle includes the generated variable convoy ID and is transmitted by the wireless communication unit of the subject vehicle while the subject vehicle is leading the convoy.

6. The convoy travel apparatus of claim 1, wherein the convoy travel control unit transmits, via the wireless communication unit, the convoy travel information including a maximum allowable number of vehicles in the convoy and a currently-included number of vehicles in the convoy, when the subject vehicle is a leader of a convoy, and the convoy travel control unit of the subject vehicle determines whether the subject vehicle can join a convoy based on a maximum allowable number of vehicles and a currently-included number of vehicles provided in the convoy travel information received, when the subject vehicle is in a non-convoy traveling state.

7. The convoy travel apparatus of claim 6, wherein, the convoy travel control unit increases the currently-included number of vehicles by one when the convoy travel information received by the wireless communication unit includes the follower notice while the subject vehicle is the leader of the convoy, and the convoy travel control unit identifies the convoy travel information from a vehicle having been traveling at a rear end position of the convoy based on an identification result of the sender vehicle by the sender vehicle identification unit, and performs a following travel control for following the vehicle at the rear end position of the convoy based on the convoy travel information identified, and transmits the convoy travel information including the follower notice to such vehicle, when the convoy travel control unit determines that the subject vehicle can join the convoy.

* * * * *